July 30, 1940.  A. H. MOSHER  2,209,788
BATTERY FILLING DEVICE
Filed Nov. 24, 1937
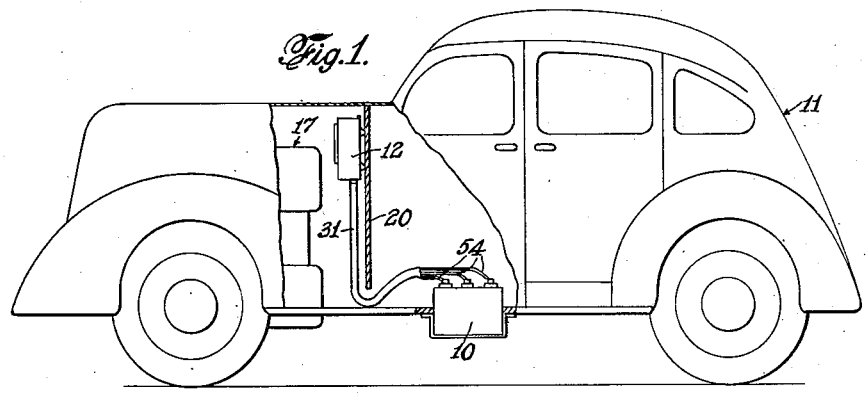
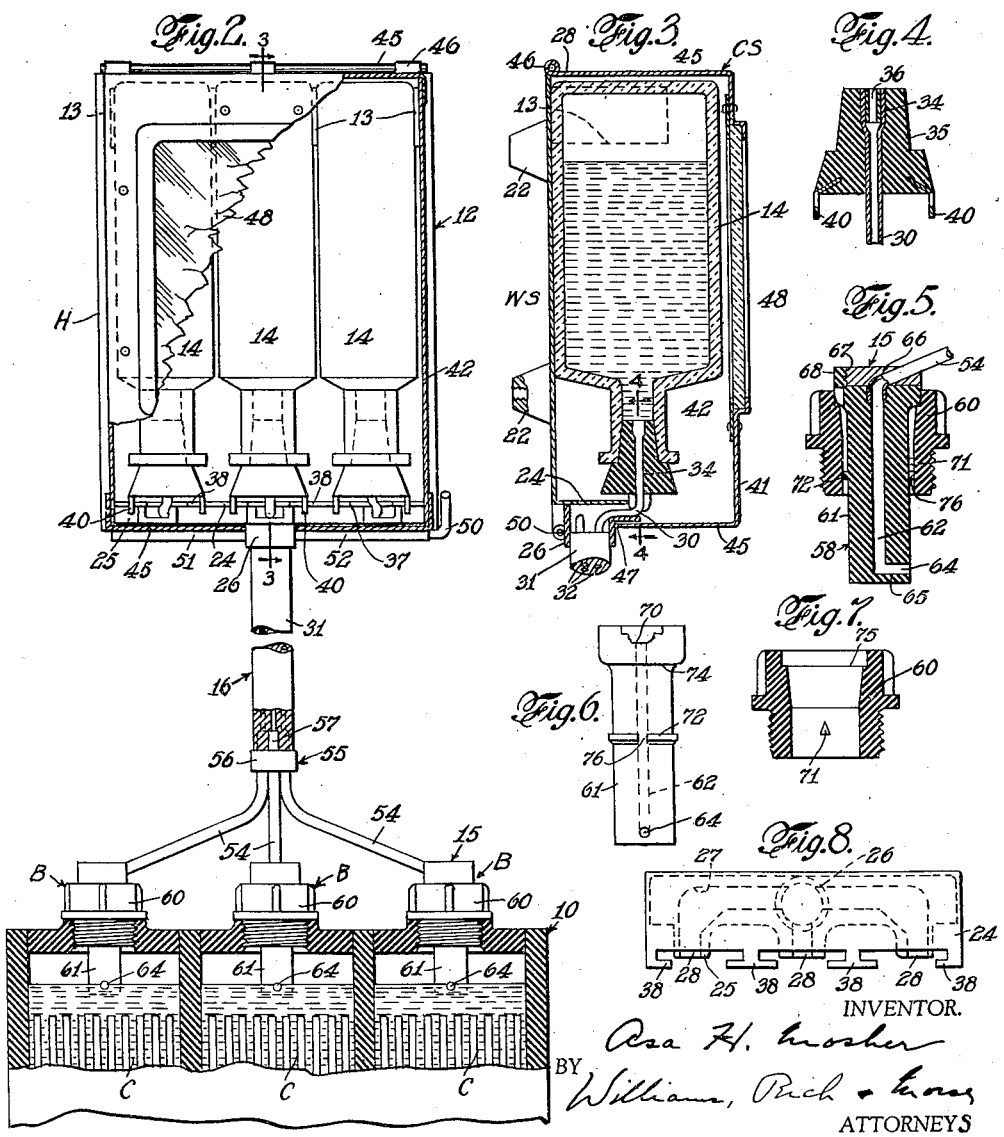
INVENTOR.
Asa H. Mosher
BY
Williams, Rich & Morse
ATTORNEYS Patented July 30, 1940

2,209,788

UNITED STATES PATENT OFFICE 2,209,788

BATTERY FILLING DEVICE

Asa H. Mosher, Westfield, N. J.

Application November 24, 1937, Serial No. 176,148

9 Claims. (Cl. 137—68)

This invention relates to electrolyte-level-control apparatus and is herein illustrated in association with a storage battery, constituting a standard part of the equipment of an automobile.

An important object of the present invention is to provide an improved electrolyte-level-control apparatus which is simple in construction, inexpensive to manufacture and reliable in operation.

Other objects and advantages of the invention will become apparent from the following description when taken in connection with the accompanying drawing, in which—

Fig. 1 is a view partly in section and partly in elevation of an automobile equipped with the present invention; Fig. 2 is a view showing partly in elevation and partly in section the reservoir unit and storage battery of Fig. 1; Fig. 3 is a central, vertical, sectional view taken on line 3—3 of Fig. 2; Fig. 4 is a sectional view taken on line 4—4 of Fig. 3 and showing details of one of the several reservoir stoppers appearing in Fig. 2; Fig. 5 is a central, longitudinal, sectional view of one of the battery caps appearing most clearly in Fig. 2; Fig. 6 is a view showing in elevation the central unit of one of the battery caps; Fig. 7 is a central sectional view of the outer or screw-threaded collar of one of the battery caps; and Fig. 8 is a plan view of a stopper-supporting ledge forming a part of the reservoir unit.

The apparatus embodying the present invention and herein illustrated in association with a battery 10, constituting a standard part of the equipment of an automobile indicated generally by the numeral 11 in Fig. 1, comprises a reservoir unit 12 which includes a plurality of reservoirs 14, one for each of the battery cells C; a plurality of liquid control devices 15, one for each battery cell; a conduit unit 16 by which communication is afforded between the respective reservoirs and the corresponding battery cells; and periodically actuated heat-generating means cooperatively associated with said reservoirs and herein illustrated as an internal combustion engine 17 constituting the power plant of the automobile.

In order that the automobile engine 17 may be utilized as periodically-actuated-heat-generating means to effect variation in temperature of the air content of the respective reservoirs 14, the reservoir unit 12 is so mounted with relation to the automobile engine as to insure an adequate transfer of heat to the reservoirs to enable the principle on which the invention is based to be utilized in attaining the desired operation. More particularly regarding the disposition of the reservoir unit 12 with relation to the engine 17, it will be noted that such reservoir unit may be mounted, for example, somewhat to the rear of the engine 17, on any suitable support such as the dashboard 20 of the automobile, where it is normally housed within the engine compartment beneath the hood 18 thereof.

The reservoir unit 12 includes not only the reservoirs 14 but also a housing H comprising a rear wall section WS, provided with a plurality of outwardly projecting spring arms 13 between which the reservoirs are normally retained in their inverted positions. If desired, the rear wall section WS may be provided with a plurality of internally screw-threaded bosses 22 which may be conveniently employed when bolting or similarly connecting the unit to the dashboard 20 of the automobile. The wall section WS is provided at its lower end, reference being had to Fig. 3, with a forwardly projecting ledge 24, to which is connected a conduit-sheath 25, provided with a depending tubular boss 26 and formed with a longitudinally extending channel 27 and a plurality of branch channels 28. Due to the presence of the channels 27 and 28, the conduit-sheath 25 forms with the ledge 24 a primary passage and a plurality of secondary passages, the former of which is adapted to accommodate a plurality of rubber tubes 30 and the latter of which are adapted to individually accommodate these tubes. The tubes 30 are suitably connected to a multi-passage hose 31, preferably of rubber, the upper end of which is accommodated within the tubular boss 26 and the passages 32 of which are maintained in communication with said tubes. The upper ends of the tubes 30 are accommodated within central passages 34, formed in a plurality of rubber stoppers 35 on which the reservoirs 14 are adapted to be detachably supported. Preferably, the tubes 30 are connected to the stoppers 35 by expanding the upper ends of them into intimate engagement with the walls of the central passages 34 of the stoppers, and to this end a short length of hard rubber tubing 36 is forced into the ends of the tubes, as shown in Fig. 4, pursuant to which the tubes and tubing may be further suitably anchored against displacement if desired.

Although the reservoirs 14 are removable from their corresponding stoppers 35 to facilitate replenishing the reservoirs with water to be supplied to the respective battery cells C, the stoppers are held in permanent association with the ledge 24 by means of hinge connections 37 which are such as to permit the reservoirs to be moved forwardly and downwardly from their vertical positions or upwardly and rearwardly into vertical positions under conditions hereinafter more particularly stated. The hinge connections 37 are afforded by so forming the ledge 24 that it presents a plurality of pairs of hinge lugs 38— one pair for each stopper 35—and by molding the respective stoppers 35 about shank portions of a pair of perforated lug-like ears 40, which because of the elasticity of the rubber stoppers, may be so forced toward each other as to enable them to be placed on said hinge lugs. It will be understood that the resiliency of the rubber stoppers 35 will insure the ears 40 being moved outwardly into their respective normal positions shown in Fig. 2 incident to the release of such force as is necessary to move them toward each other when placing them on the hinge lugs 38.

The housing H of the reservoir unit 12 also comprises a box-like cover section CS having a front wall 41, side walls 42, and end walls 44 and 45. The cover section CS is so connected to the rear wall section WS that it may be moved upwardly and forwardly or downwardly and rearwardly, and to that end a suitable hinge connection 46 is provided between the rear wall section and the end wall 45 of the cover section. It is to be observed, reference being had to Fig. 3, that the end wall 45 of the cover section CS is provided at its margin with a notch 47 which is adapted, when the cover section is closed, to accommodate the depending tubular boss 26 forming a part of the conduit-sheath 25. Preferably the front wall 41 of the cover section CS is provided with a window 48, of glass or other suitable material of a transparent character, through which the reservoirs 14 may be conveniently inspected in order to enable one to readily determine at any time whether they need to be replenished with water to be delivered to the various cells C of the battery. Moreover, it will be appreciated that by inspecting the reservoirs 14 from time to time and noting the rate at which the respective cells C of the battery are consuming water from the reservoirs, one may ascertain the condition of the various cells; for example, if it is observed that the water within a given reservoir is being consumed at a slower rate than the water within the other reservoirs, an indication is thus given that the battery cell corresponding to the reservoir from which water is being consumed at an abnormally slow rate is improperly functioning and that such improper functioning may most likely reside in the inability of that cell to properly respond to charging operations.

In order that the cover section CS may be securely held in closed position, the end wall 45 of that section is provided at its rear margin or edge with a keeper or locking rod 50 which is adapted to be moved into locking position at the rear of the tubular boss 28. The locking rod 50 is housed, for longitudinal movement, in a pair of bead-like tubes 51 and 52 carried by, and preferably rolled from, the rear margin of the end wall 45 of the cover section CS, the tube 51 being located at one side of the notch 47 and the tube 52 being disposed at the opposite side of that notch.

The conduit unit 16 includes, in addition to the tubes 30 and the multi-passage hose 31, a plurality of rubber tubes 54 which are connected to the respective liquid control devices 15 and are adapted to communicate with the respective passages 32 of said hose. In order to facilitate installation of the apparatus on an automobile, the tubes 54 are secured at their upper ends to a multiple connector 55 which is adapted to be so connected to the multi-passage hose 31 as to effect unobstructed communication between the tubes 54 and the respective passages 32 of said hose. The multiple connector 55 comprises a disc-like tube support 56 of hard rubber, carrying a plurality of hard rubber connector tubes 57, the upper ends of which are adapted to be inserted in the respective passages 32 of the multi-passage hose 31 and the lower ends of which are secured in the upper ends of the tubes 54. If desired, the multiple connector 55, upon completion of the installation of the apparatus, may be permanently secured to the multi-passage hose 31 by any appropriate means.

The control devices 15, to which the tubes 54 are respectively connected, are each in the form of a special battery cap B which includes two primary parts of hard rubber, namely, a central unit 58 and a screw-threaded collar 60 journalled on that unit and adapted, while such unit is held against rotation, to be screwed into or out of the ordinary screw-threaded battery opening, one of which leads to each of the battery cells C as shown in Fig. 2.

Each central unit 58 is in the general form of a tube 61, the central passage 62 of which extends downwardly in the central unit and terminates relatively near the lower end thereof where it is adapted to communicate with a battery cell by way of a branch passage 64 leading radially outwardly through the wall of said tube. As to the passages 62 and 64, it is to be observed that they are guarded by a baffle wall 65, which is in integral formation with the tube 61 and which serves to prevent bubbles of gas, such as occur during battery charging, from entering the passage 62, thus obviating any possibility of undue operation of the apparatus.

In order that the tubes 54 may be effectively secured to the respective control devices 15, the lower ends of such tubes are inserted in the upper ends of the central passages 62 of the central units 58 and are anchored in place by molding thereabout disc-like plugs 66 of asphaltum, the asphaltum being poured or otherwise introduced into cup-like cavities 67 provided in the upper ends of the central units, the boundary rims or walls 68 of such cavities being formed with tube-receiving notches 70 which are adapted to accommodate the tubes 54 where they enter the asphaltum at an acute angle.

As shown in the drawing and for the reasons hereinafter explained, the internal cross-sectional area of each conduit means leading from a reservoir to its corresponding cell is so small that liquid only or air only can pass through it; that is, bubbles of air cannot pass through liquid in said conduit means, and vibratory movements of the apparatus when in use do not influence the flow of liquid from a reservoir into its corresponding cell. Moreover, the length of each such conduit means is such that the total volume of the passage therein is less than the volume of liquid displaced from the corresponding reservoir at any one time incident to subjecting the liquid content of said reservoir to positive pressure. That is, the length of each such conduit means is such that the total volume of the passage therein is less than the difference in air volume produced in the corresponding reservoir by the temperature differential occurring in said reservoir due to operation of the engine.

The screw-threaded collar 60 of each battery cap B is provided on its inner wall with a retaining lug 71, which is adapted to cooperate with a retaining flange 72, provided on the outer wall of the central unit 58 intermediate the ends thereof and adapted to cooperate with said lug to retain the central unit against undue upward displacement when the battery cap is assembled, undue downward displacement of the central unit being prevented by reason of the fact that such unit is provided at its upper or head end with a peripheral shoulder 74 which is adapted to rest on a ledge 75 formed interiorly of the screw-threaded collar relatively near the upper end thereof. In order to facilitate assembling of the central unit 58 and screw-threaded collar 60, the retaining flange 72 is of split formation, thus providing a gap-like slot 76 through which the lug 71 of the screw-threaded collar may pass as the central unit is inserted in that collar. As to the lug 71, it will be observed that it is somewhat tapered towards its upper end to facilitate its entering the gap-like slot 76, but presents at its lower end a width substantially equal to, although somewhat less than, the width of the gap-like slot, so as to substantially insure the central unit 58 against removal from the screw-threaded collar except when, by careful manipulation, the lug 71 and gap-like slot 76 are brought into perfect or substantially perfect alignment or registration. It is to be observed that since the screw-threaded collars 60 are standardized with respect to batteries, for example those of the type employed generally as present-day automobile equipment, and inasmuch as the central units 58 are adapted to be inserted in the collars when assembling the battery caps B, it follows that by making the central units 58 of different lengths the branch passage 64 may be located above the battery plates in accordance with different battery requirements, thus making it possible to meet such requirements when assembling the battery caps at the factory.

In describing the operation of the apparatus, the expression "normal level" of the battery electrolyte will be employed to denote the electrolyte level as determined by the branch passages 64 leading from the central units 58 of the battery caps B.

When considering the operation of the apparatus, it is to be assumed that the normal level of the electrolyte (see Fig. 2) was reached incident to the completion of an imaginary cycle of operation of the apparatus, it being observed that a cycle includes the steps of heating and then cooling the air above the liquid within the respective reservoirs 14. The heating step in each cycle of operation of the apparatus is effected in the present embodiment of the invention by utilizing the automobile engine 17 as an intermittently actuated source of heat. Inasmuch as the reservoir unit 12 is so located with respect to the engine 17 that the reservoirs 14 are maintained in a heat-transfer relation to such source of heat, the air confined within the reservoirs above the liquid content thereof is expanded under the action of heat delivered thereto and thus caused to exert such pressure on the liquid within the reservoirs that it is forcibly directed into the several cells C by way of the tubes 30, the multi-passage hose 31, the tubes 54, and the passages 62 and 64 of the respective liquid control devices 15. As the liquid is thus forcibly directed into the cells C, the electrolyte level rises above the passages 64 and continues to rise until such time as the temperature of the air within the several reservoirs 14 ceases to rise. When the temperature of the air within the several reservoirs 14 drops incident to an ambient temperature drop, effected for example when the operation of the engine 17 is discontinued, the air content of the reservoirs contracts, thus producing within each of such reservoirs a partial vacuum, as a result of which liquid is drawn from the several cells upwardly into the reservoirs by way of passages 62 and 64 of the respective filling devices, the several tubes 54, passages 32 of the multi-passage hose 31, and the tubes 30 leading from that conduit into the reservoirs by way of their associated stoppers 35. Such drawing up of the liquid continues so long as the battery electrolyte covers the passages 64 of the control devices 15 and so long as any appreciable vacuum condition exists within the several reservoirs; but under no circumstances can the electrolyte within the battery recede below its normal level as a result of the operation of the apparatus, because when it reaches that level the passages 64 of the several control devices 15 are sufficiently uncovered by the electrolyte to permit air instead of liquid to be drawn from the cells C into the reservoirs so as to substantially, if not completely, destroy the previously effected vacuum condition.

Therefore, it will be apparent that the feeding of the liquid from each reservoir through its conduit means to its corresponding battery cell is caused solely by the expansion by heat of the contents of said reservoir, and that the introduction of air into said reservoir takes place only after its conduit has been freed of liquid by the suction exerted by the contents of said reservoir on cooling.

The foregoing description of the operation of the apparatus assumes an electrolyte level which is at no time below the passages 64 of the several control devices 15, but it may be well to supplement that description of operation by a further description of the operation of the apparatus where the initial electrolyte level is assumed to be below the passages 64 of the several control devices 15. Such an extreme low-level-electrolyte condition may be encountered, for example, where an automobile has been placed in storage for a considerable length of time without water having been supplied to the battery in order to compensate for normal or ordinary evaporation. Considering the operation of the present apparatus in connection with a battery to which an extreme low-level-electrolyte condition, such as that just mentioned, is peculiar, it will be observed that on the first half-cycle operation, liquid will be delivered to the cells C from the several reservoirs 14, and that on the second half-cycle operation only air will be drawn into the reservoirs from the cells until the battery electrolyte-level is sufficiently high to effect, on the second half-cycle operation, the removal of liquid and air from the several cells in the manner already described.

In order that the apparatus embodying the present invention may be better understood from a standpoint of dimensional ratios, it is deemed advisable to here point out that—

Satisfactory operation (in connection with a storage battery having in each cell a volumetric capacity of seven fluid ounces, as calculated above the plane of the branch passage 64 of the respective control devices 15) has been attained when using eight-ounce reservoirs 14 initially containing 7¼ ounces of water, the independent liquid conduits (comprising the various tubular elements interposed between the corresponding reservoirs and battery cells) being each five feet long and having an inside diameter of 1/16" and carrying a liquid head of 20 inches as measured from the normal electrolyte level to the maximum liquid level of the reservoirs. It has been found that a temperature differential as low as 25° F. (i. e., a rise of 25° F.—beneath the engine hood of an automobile—effecting a corresponding, although not necessarily an identical, rise in temperature of the air content of the respective reservoirs) is sufficient to insure reliable operation of the apparatus. Moreover, it has been determined that reliable operation is insured regardless of the points at which the temperature rise, representing the twenty-five degree differential, is initiated and completed within limits corresponding, on the one hand, to the freezing point and, on the other hand, to the boiling point of the liquid within the reservoirs 14.

Regarding the matter of a permissible maximum temperature differential, it may be well to here note that it has been found that under no conditions arising in connection with the use of the apparatus when installed on an automobile in the manner herein described, can sufficient liquid be expelled to discharge more than five ounces of liquid from each reservoir incident on any first half-cycle operation. Thus it becomes apparent that the equivalent of at least two fluid ounces of unfilled space above the normal electrolyte level of each battery cell is insured as a safety factor against what might be regarded as the equivalent of over-flowing due to such slopping of the electrolyte as is set up for example under adverse road conditions.

Although the apparatus embodying the present invention may be satisfactorily used where installation conditions are such as to permit the several reservoirs to be placed directly or substantially directly over the battery, such disposition of the reservoirs with relation to the battery is not necessary. For example, satisfactory operation may be attained where the independent liquid conduits, comprising the various tubes and passages leading from the several cells to the several reservoirs, are disposed horizontally for a substantial portion of their lengths and then carried upwardly to their respective points of connection with the reservoirs, or where such conduits lead generally downwardly from the battery and then upwardly to the respective reservoirs as illustrated in Fig. 1, or even where such conduits lead generally downwardly from the battery to the respective reservoirs.

Various arrangements, including those just mentioned as illustrative of the fact that the apparatus embodying the present invention lends or accommodates itself to a wide range of different types of installations, are made possible without in any way sacrificing reliability in operation because (1) liquid is forcibly delivered to the battery cells under the action of positive pressure periodically generated within the reservoirs, (2) any excess liquid thus delivered to the cells is drawn therefrom into the reservoirs under the action of negative pressure periodically generated therein, and (3) in the event conditions are such that the battery electrolyte recedes to its normal level and entrance of air into the reservoirs is then prompted in order to satisfy the partial vacuum condition therein, the entire liquid content of the several individual liquid conduits, having small cross-sectional areas as hereinbefore described, is drawn into the reservoirs ahead of the columns of air in such conduits, thus obviating the formation of air pockets, such as would occur for example at the high points (see Fig. 1) of the conduits were they of large cross-sectional area and were the liquid columns permitted to remain intact and were it necessary to depend on air bubbling or rising through such liquid columns to satisfy the partial vacuum needs of the reservoirs.

Additionally, it is to be noted that as electrolyte is drawn into the reservoirs 14 from the battery cells C on the second half-cycle operation of the apparatus, the freezing point of the liquid content of the reservoirs, assuming pure water to be initially contained in such reservoirs, is lowered. The lowering of the freezing point of the liquid content of the reservoirs 14 in this manner becomes more and more pronounced as each cycle of operation is carried out, with the result that the characteristics of the liquid content of the reservoirs more and more nearly approach those of the electrolyte from an acid and/or specific-gravity standpoint. Moreover, it is to be observed that any liquid left, pursuant to a cycle of operation, in the several conduits leading from the reservoirs 14 to the battery cells C will be electrolyte and identical with the electrolyte in the several cells. It follows, therefore, that the liquid in the conduits cannot freeze any more readily than can the electrolyte in the battery. Such a safeguard against freezing of the liquid in the conduits is an advantage, because it obviates the necessity of having to arrange the conduits in a heat-transfer relation to the periodically-actuated source of heat and of having to utilize heat from that source as an ice-dissipating medium. Inasmuch as the liquid in the reservoirs 14, assuming pure water to be contained in the reservoirs initially, will theoretically never reach the acidity and/or specific gravity of the battery electrolyte, it follows that the freezing point of the liquid content of the reservoirs will never be as low as that of the battery electrolyte. Consequently the liquid content of the reservoirs 14 will freeze more readily than the battery electrolyte, but in this connection it is to be observed that such freezing offers no objection, because sufficient air space is at all times available in the reservoirs to permit the liquid incident to freezing to expand upwardly, thus obviating possible breakage of the reservoirs, and because any ice forming in the reservoirs is dissipated by the heat of the engine before the battery demands any excessive quantity of replenishing liquid subsequent to the instant the operation of the engine is initiated.

Although only one form of the invention is shown and described, it will be understood that various changes may be made without departing from the spirit of the invention or the scope of the following claims.

What is claimed is:

1. An electrolyte-level-control apparatus for use with an electric storage battery cell comprising a reservoir adapted to contain a liquid, periodically acuated means disposed in a cooperative relation to said reservoir for subjecting the liquid content of said reservoir to positive pressure, on the one hand, and to negative pressure, on the other hand, and conduit means leading from said reservoir to said cell and by way of which liquid is directed from said reservoir into said cell incident to subjecting the liquid content of said reservoir to positive pressure and by way of which fluid is drawn from said cell into said reservoir incident to subjecting the liquid content of said reservoir to negative pressure, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

2. An electrolyte-level-control apparatus for use with an electric storage battery cell comprising a reservoir adapted to contain a liquid, periodically actuated means disposed in a cooperative relation to said reservoir for subjecting the liquid content of said reservoir to positive pressure, on the one hand, and to negative pressure, on the other hand, and conduit means leading from said reservoir to said cell and having at its cell end an electrolyte-level-determining opening by way of which liquid is directed from said reservoir into said cell incident to subjecting the liquid content of said reservoir to a positive pressure and by way of which fluid is drawn from said cell into said reservoir incident to subjecting the liquid content of said reservoir to negative pressure, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

3. An electrolyte-level-control apparatus for use with an electric storage battery cell comprising a reservoir adapted to contain liquid and entrapped actuating fluids, said fluid being adapted incident to a rise in temperature thereof to exert a positive pressure on said liquid and adapted incident to a drop in temperature thereof to exert a negative pressure on said liquid, periodically actuated heat-generating means disposed in a heat-transfer relation to said reservoir and according to the operation of which the temperature of said actuating fluid is varied, and conduit means leading from said reservoir to said cell and by way of which liquid is directed from said reservoir into said cell incident to a rise in temperature of said actuating fluid and by way of which fluid is drawn from said cell into said reservoir incident to a drop in temperature of said actuating fluid, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

4. An electrolyte-level-control apparatus for use with an electric storage battery cell comprising a reservoir adapted to contain liquid and entrapped actuating fluid, said fluid being adapted incident to a rise in temperature thereof to exert a positive pressure on said liquid and adapted incident to a drop in temperature thereof to exert a negative pressure on said liquid, periodically actuated heat-generating means disposed in a heat-transfer relation to said reservoir and according to the operation of which the temperature of said actuating fluid is varied, and conduit means leading from said reservoir to said cell and having at its cell end an electrolyte-level-determining opening by way of which liquid is directed from said reservoir into said cell incident to a rise in temperature of said actuating fluid and by way of which fluid is drawn from said cell into said reservoir incident to a drop in temperature of said actuating fluid, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

5. An electrolyte-level-control apparatus for use with an electric storage battery cell comprising a reservoir adapted to contain liquid and entrapped actuating fluid, said fluid being adapted incident to a rise in temperature thereof to exert a positive pressure on said liquid and adapted incident to a drop in temperature thereof to exert a negative pressure on said liquid, periodically actuated heat-generating means constituting an internal combustion engine disposed in a heat-transfer relation to said reservoir and according to the operation of which the temperature of said actuating fluid is varied, and conduit means leading from said reservoir to said cell and by way of which liquid is directed from said reservoir into said cell incident to a rise in temperature of said actuating fluid and by way of which fluid is drawn from said cell into said reservoir incident to a drop in temperature of said actuating fluid, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

6. An electrolyte-level-control apparatus for use with an electric storage battery cell comprising a reservoir adapted to contain liquid and entrapped actuating fluid, said fluid being adapted incident to a rise in temperature thereof to exert a positive pressure on said liquid and adapted incident to a drop in temperature thereof to exert a negative pressure on said liquid, periodically actuated heat-generating means constituting an internal combustion engine disposed in a heat-transfer relation to said reservoir and according to the operation of which the temperature of said actuating fluid is varied, and conduit means leading from said reservoir to said cell and having at its cell end an electrolyte-level-determining opening by way of which liquid is directed from said reservoir into said cell incident to a rise in temperature of said actuating fluid and by way of which fluid is drawn from said cell into said reservoir incident to a drop in temperature of said actuating fluid, the internal cross-sectional area of said conduit means being so small that liquid only or air only can pass through it, and the length of said conduit means being such that the total volume of the passage therein is less than the volume of liquid displaced from the reservoir at any one time incident to subjecting the liquid content thereof to positive pressure.

7. An electrolyte-level-control apparatus for use with an electric storage battery cell comprising a reservoir adapted to contain liquid and entrapped air; periodically actuated heat-generating means disposed in a heat-transfer relation to said reservoir for periodically varying the temperature of the air in said reservoir so that expansion and contraction of the air exerts positive and negative pressures on said liquid; and a conduit leading from said reservoir to the normal electrolyte level in said cell, by way of which conduit liquid is directed from said reservoir into said cell incident to a rise in temperature of the air in said reservoir, and by way of which conduit liquid and then air are drawn from said cell into said reservoir incident to a drop in temperature of the air in said reservoir, the internal cross-sectional area of said conduit being so small that liquid only or air only can pass through it, and the length of said conduit being such that the total volume of the passage therein is less than the difference in air volume produced in the reservoir by the temperature differential occurring in said reservoir due to actuation of said heat-generating means.

8. In an electrolyte-level-control apparatus for use with an electric storage battery cell; a reservoir unit comprising a stopper of resilient material; a reservoir adapted to be carried on said stopper in an inverted position and to contain liquid to be delivered to said cell; and hinge means supporting said stopper and its associated reservoir for upward and downward pivotal movements and comprising a pair of perforated lug-like ears molded into said stopper and adapted to be moved toward each other by compressing the stopper, and a ledge having a pair of hinge lugs provided thereon and adapted to receive said perforated lug-like ears and pivotally support them.

9. An electrolyte-level-control apparatus for use with an electric storage battery cell mounted on an engine propelled vehicle comprising a reservoir adapted to contain liquid and entrapped air and adapted to be mounted on the vehicle in a position to be periodically heated by said engine, and a single conduit leading from said reservoir to said cell and having at its cell end an opening at approximately the level above which it is desired to maintain the electrolyte in said cell, the internal cross-sectional area of said conduit being so small that liquid only or air only can pass through it, and the length of said conduit being such that the total volume of the passage therein is less than the difference in air volume produced in the reservoir by the temperature differential occurring in said reservoir due to operation of the engine, whereby the feeding of the liquid through said conduit to said cell is caused solely by the expansion by heat of the contents of said reservoir and the introduction of air into said reservoir takes place only when said conduit has been freed of liquid by the suction exerted by the contents of said reservoir on cooling.

ASA H. MOSHER.